US012669858B2

(12) United States Patent
Candan et al.

(10) Patent No.: US 12,669,858 B2
(45) Date of Patent: Jun. 30, 2026

(54) VERIFICATION OF POWER CABLE CHECK ON SERVER EQUIPMENT

(71) Applicant: International Business Machines Corporation, Armonk, NY (US)

(72) Inventors: Enver Candan, Cornwall, NY (US); Brian Charles Tucker, Clinton Corners, NY (US); Marc Henri Coq, Hopewell Junction, NY (US)

(73) Assignee: International Business Machines Corporation, Armonk, NY (US)

( * ) Notice: Subject to any disclaimer, the term of this patent is extended or adjusted under 35 U.S.C. 154(b) by 161 days.

(21) Appl. No.: 18/675,219

(22) Filed: May 28, 2024

(65) Prior Publication Data

US 2025/0370525 A1     Dec. 4, 2025

(51) Int. Cl.
G06F 1/28          (2006.01)

(52) U.S. Cl.
CPC ...................................... G06F 1/28 (2013.01)

(58) Field of Classification Search
CPC ... G06F 1/28; G06F 1/26; G06F 1/263; G06F 1/3203; G06F 1/3206
See application file for complete search history.

(56) References Cited

U.S. PATENT DOCUMENTS 7,030,734 B2 * 4/2006 Butler .................... H04B 3/542
                                                340/310.18
8,001,403 B2 * 8/2011 Hamilton .............. G06F 1/3203
                                                713/323

8,097,985 B2   1/2012 Carson et al.
8,674,823 B1 * 3/2014 Contario ............. G01R 19/145
                                                340/693.1
9,329,654 B2   5/2016 Hutten et al.
9,684,351 B2   6/2017 Liu et al.
10,007,583 B2  6/2018 Gao et al.
10,346,271 B2  7/2019 Jau et al.
10,886,776 B1  1/2021 Dias
            (Continued)

OTHER PUBLICATIONS

Ahmed et al., "A Novel Reliability Index to Assess the Computational Resource Adequacy in Data Centers", IEEE Access, vol. 9, 2021, pp. 54530-54541.

(Continued)

*Primary Examiner* — Raymond N Phan
(74) *Attorney, Agent, or Firm* — CANTOR COLBURN LLP; Teddi Maranzano

(57)          ABSTRACT

Computer-implemented methods for power cable connection verification for a plurality of pieces of electronic equipment connected to a power distribution device are provided. Aspects include instructing a first power supply of a first piece of electronic equipment to modify a first power signal received from the power distribution device and instructing a second power supply of a second piece of electronic equipment to modify a second power signal received from the power distribution device. Aspects also include identifying a first port of a plurality of ports of the power distribution device corresponding to the first power signal and a second port of the plurality of ports of the power distribution device corresponding to the second power signal and creating a mapping of the plurality of pieces of electronic equipment to the plurality of ports of the power distribution device.

17 Claims, 6 Drawing Sheets

(56) References Cited

U.S. PATENT DOCUMENTS

| | | | |
|---|---|---|---|
| 11,183,841 B2 | 11/2021 | Nguyen | |
| 11,281,267 B2 | 3/2022 | Klaba | |
| 11,450,992 B2 | 9/2022 | Trenbath et al. | |
| 11,474,582 B2 | 10/2022 | Lefurgy et al. | |
| 11,876,382 B2 | 1/2024 | Gu et al. | |
| 11,910,554 B2 | 2/2024 | Arduini et al. | |
| 2006/0044117 A1* | 3/2006 | Farkas | H05K 7/1498 |
| | | | 713/340 |
| 2009/0217073 A1* | 8/2009 | Brech | G06F 1/28 |
| | | | 713/340 |
| 2009/0307515 A1* | 12/2009 | Bandholz | G06F 1/26 |
| | | | 713/340 |
| 2010/0262393 A1 | 10/2010 | Sharma et al. | |
| 2011/0320827 A1* | 12/2011 | Siegman | H02J 13/0005 |
| | | | 713/300 |
| 2014/0115353 A1* | 4/2014 | Hutten | G06F 1/266 |
| | | | 713/310 |
| 2016/0306397 A1 | 10/2016 | Chen et al. | |
| 2021/0184461 A1 | 6/2021 | Bickel et al. | |
| 2021/0249823 A1 | 8/2021 | Eriksen et al. | |
| 2022/0376503 A1 | 11/2022 | Eleftheriadis et al. | |
| 2023/0246855 A1 | 8/2023 | Goergen et al. | |
| 2023/0315183 A1 | 10/2023 | Messick et al. | |

OTHER PUBLICATIONS

Chen et al., "PowerMan: An Out-Of-Band Management Network For Datacenters Using Power Line Communication", Proceedings of the 15th USENIX Symposium On Networked Systems Design and Implementation (NSDI '18), Apr. 9-11, 2018, pp. 561-578.
Chrysostomou et al., "A Novel Machine Learning-Based Load-Adaptive Power Supply System for Improved Energy Efficiency in Datacenters", IEEE Access, vol. 9, 2021, pp. 161898-161908.
Wemhoff et al., "Coupled Calculations of Data Center Cooling and Power Distribution Systems", Journal of Electronic Packaging, vol. 144, Dec. 2022, pp. 1-9.
Ye et al., "Fault Reconstruction Method of High Redundancy Satellite Power Distribution Unit", IET Power Electronics, vol. 16, No. 8, 2023, pp. 1443-1454.

* cited by examiner

100

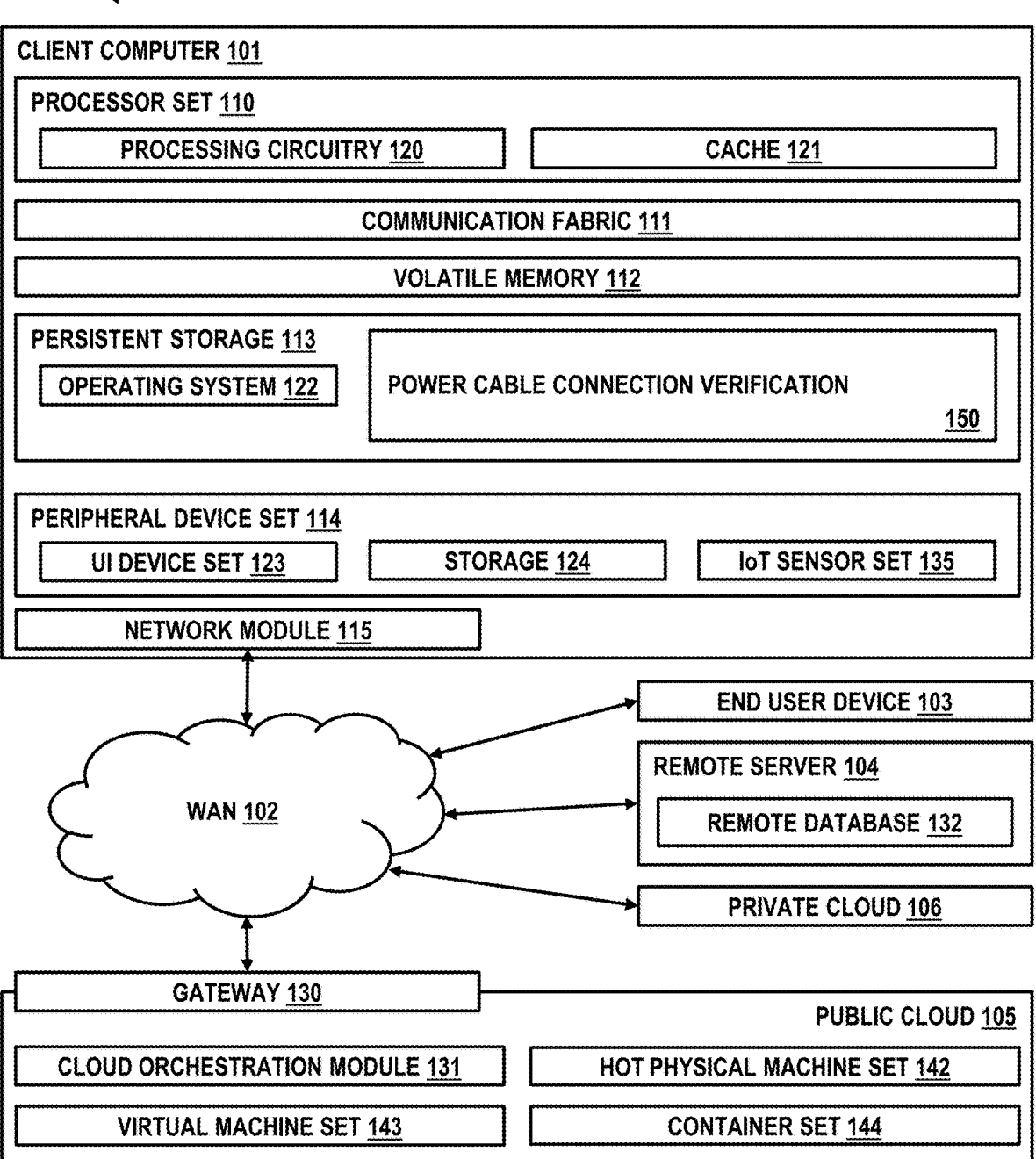

CLIENT COMPUTER 101

PROCESSOR SET 110

PROCESSING CIRCUITRY 120          CACHE 121

COMMUNICATION FABRIC 111

VOLATILE MEMORY 112

PERSISTENT STORAGE 113

OPERATING SYSTEM 122          POWER CABLE CONNECTION VERIFICATION 150

PERIPHERAL DEVICE SET 114

UI DEVICE SET 123          STORAGE 124          IoT SENSOR SET 135

NETWORK MODULE 115

WAN 102

END USER DEVICE 103

REMOTE SERVER 104

REMOTE DATABASE 132

PRIVATE CLOUD 106

GATEWAY 130

PUBLIC CLOUD 105

CLOUD ORCHESTRATION MODULE 131          HOT PHYSICAL MACHINE SET 142

VIRTUAL MACHINE SET 143          CONTAINER SET 144

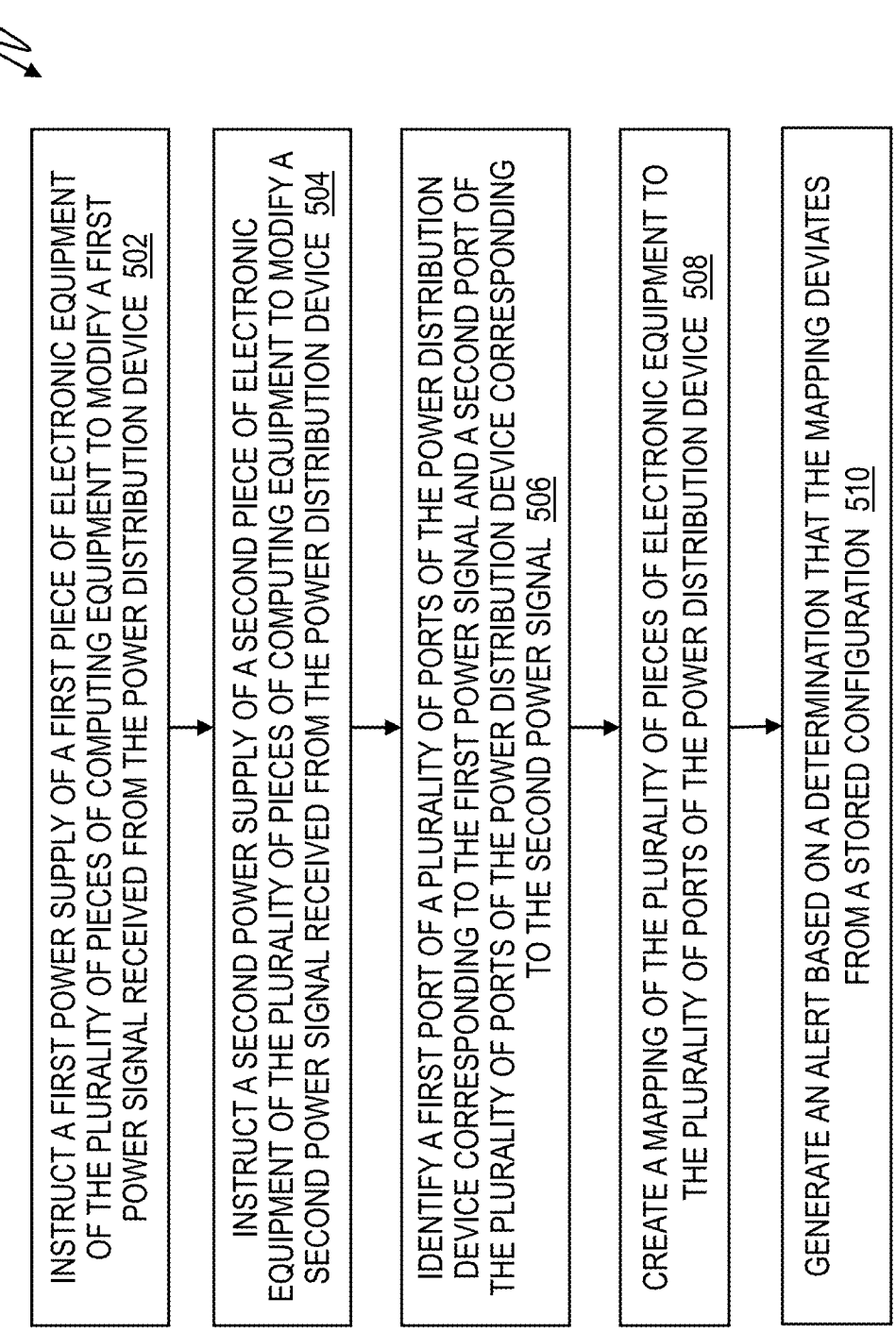

INSTRUCT A FIRST POWER SUPPLY OF A FIRST PIECE OF ELECTRONIC EQUIPMENT OF THE PLURALITY OF PIECES OF COMPUTING EQUIPMENT TO MODIFY A FIRST POWER SIGNAL RECEIVED FROM THE POWER DISTRIBUTION DEVICE 502

INSTRUCT A SECOND POWER SUPPLY OF A SECOND PIECE OF ELECTRONIC EQUIPMENT OF THE PLURALITY OF PIECES OF COMPUTING EQUIPMENT TO MODIFY A SECOND POWER SIGNAL RECEIVED FROM THE POWER DISTRIBUTION DEVICE 504

IDENTIFY A FIRST PORT OF A PLURALITY OF PORTS OF THE POWER DISTRIBUTION DEVICE CORRESPONDING TO THE FIRST POWER SIGNAL AND A SECOND PORT OF THE PLURALITY OF PORTS OF THE POWER DISTRIBUTION DEVICE CORRESPONDING TO THE SECOND POWER SIGNAL 506

CREATE A MAPPING OF THE PLURALITY OF PIECES OF ELECTRONIC EQUIPMENT TO THE PLURALITY OF PORTS OF THE POWER DISTRIBUTION DEVICE 508

GENERATE AN ALERT BASED ON A DETERMINATION THAT THE MAPPING DEVIATES FROM A STORED CONFIGURATION 510

FIG. 5

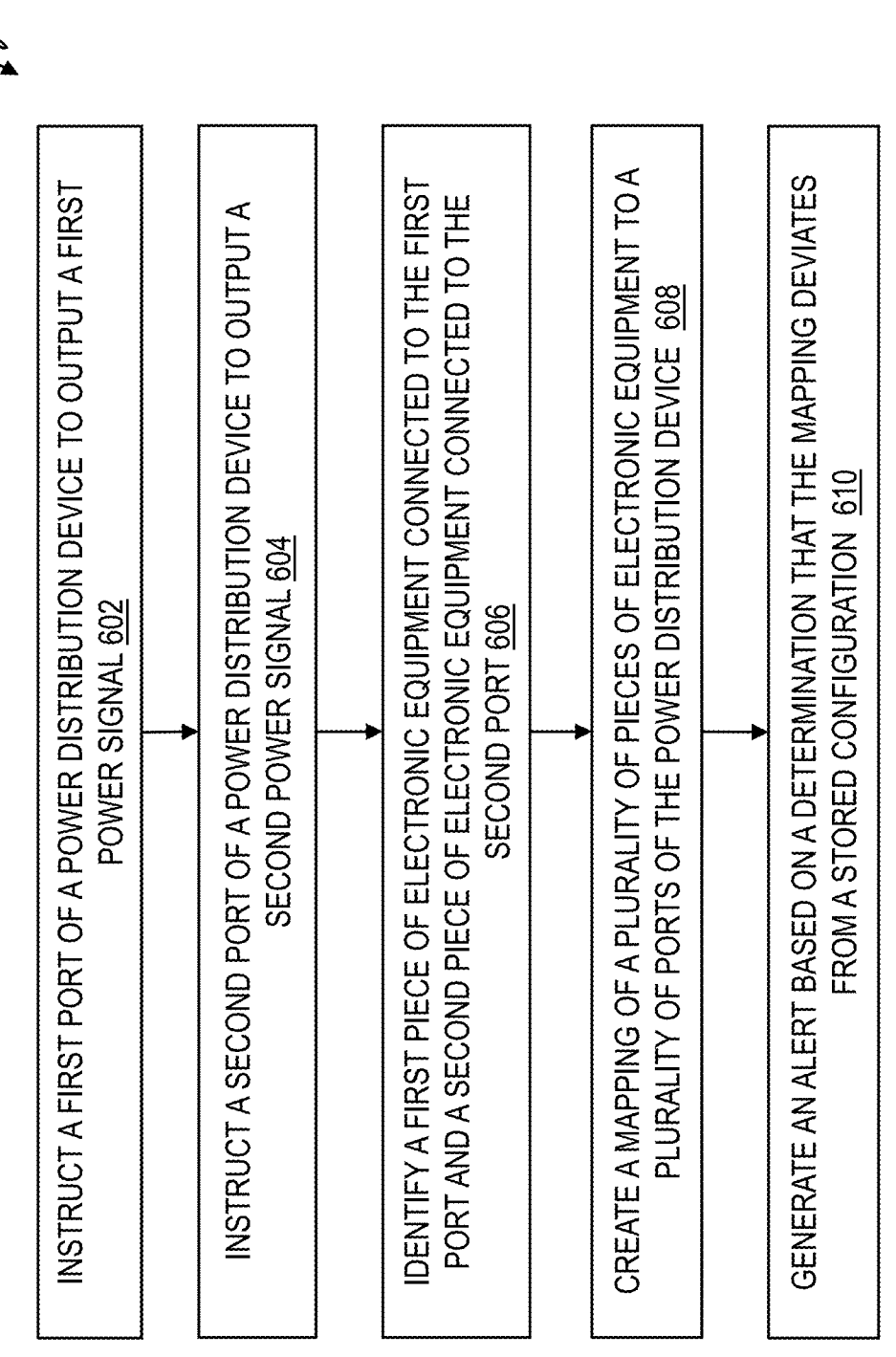

600

INSTRUCT A FIRST PORT OF A POWER DISTRIBUTION DEVICE TO OUTPUT A FIRST POWER SIGNAL 602

INSTRUCT A SECOND PORT OF A POWER DISTRIBUTION DEVICE TO OUTPUT A SECOND POWER SIGNAL 604

IDENTIFY A FIRST PIECE OF ELECTRONIC EQUIPMENT CONNECTED TO THE FIRST PORT AND A SECOND PIECE OF ELECTRONIC EQUIPMENT CONNECTED TO THE SECOND PORT 606

CREATE A MAPPING OF A PLURALITY OF PIECES OF ELECTRONIC EQUIPMENT TO A PLURALITY OF PORTS OF THE POWER DISTRIBUTION DEVICE 608

GENERATE AN ALERT BASED ON A DETERMINATION THAT THE MAPPING DEVIATES FROM A STORED CONFIGURATION 610

FIG. 6

VERIFICATION OF POWER CABLE CHECK ON SERVER EQUIPMENT

BACKGROUND

The present disclosure generally relates to data center or Infrastructure Technology (I/T) environments, and more specifically, to providing verification of power cable connections in a data center environment.

Electronic equipment, such as information technology, communications, industrial, or other equipment that operates in a high-availability fashion requires a robust electrical power delivery. Electronic equipment that is designed for such operating conditions relies on electrical infrastructure equipment such as power distribution units (PDUs) devices, protection devices, cabling, etc. In general, power distribution planning includes assigning output ports of a PDU to specific pieces of electronic equipment to ensure the available power capacity and protection devices are properly allocated.

Currently, to confirm that the power distribution planning at a site is being followed, a cable check can be executed after the setup of the site. The cable check includes sequentially turning off the ports of the PDU and observing when each piece of electronic equipment experiences a loss of power. Typically, confirming one PDU-PSU cabling could take 60-90 seconds. Accordingly, performing the cable check for a complex system may take more than one hour.

In addition, a cable check is typically only performed at the time of installation. After the product installation or service personnel leaves the client facility, there exists the risk that the client may change cabling during a maintenance or repair action, resulting in a power cabling error. Such a cabling error could reduce the overall availability of the connected equipment and may prolong any associated outage. Moreover, the cabling error often remains unnoticed until an outage occurs, which also increases the time it takes to pinpoint the actual problem.

SUMMARY

Embodiments of the present disclosure are directed to computer-implemented methods for power cable connection verification in a data center environment having a plurality of pieces of electronic equipment connected to a power distribution. According to an aspect, a computer-implemented method includes instructing a first power supply of a first piece of electronic equipment of the plurality of pieces of electronic equipment to modify a first power signal received from the power distribution device and instructing a second power supply of a second piece of electronic equipment of the plurality of pieces of electronic equipment to modify a second power signal received from the power distribution device. The method also includes identifying a first port of a plurality of ports of the power distribution device corresponding to the first power signal and a second port of the plurality of ports of the power distribution device corresponding to the second power signal and creating a mapping of the plurality of pieces of electronic equipment to the plurality of ports of the power distribution device.

Embodiments also include computing systems and computer program products for performing verification of power cable connections in a data center environment.

Additional technical features and benefits are realized through the techniques of the present disclosure. Embodiments and aspects of the disclosure are described in detail herein and are considered a part of the claimed subject matter. For a better understanding, refer to the detailed description and to the drawings.

BRIEF DESCRIPTION OF THE DRAWINGS

The specifics of the exclusive rights described herein are particularly pointed out and distinctly claimed in the claims at the conclusion of the specification. The foregoing and other features and advantages of the embodiments of the present disclosure are apparent from the following detailed description taken in conjunction with the accompanying drawings in which:

FIG. 1 depicts a block diagram of an example computer system for use in conjunction with one or more embodiments of the present disclosure;

FIG. 5 depicts a flowchart of a method for verifying power cable connections in a data center environment in accordance with one or more embodiments of the present disclosure and FIG. 6 depicts a flowchart of a method verifying power cable connections in a data center environment in accordance with one or more embodiments of the present disclosure.

DETAILED DESCRIPTION

Figure 2:
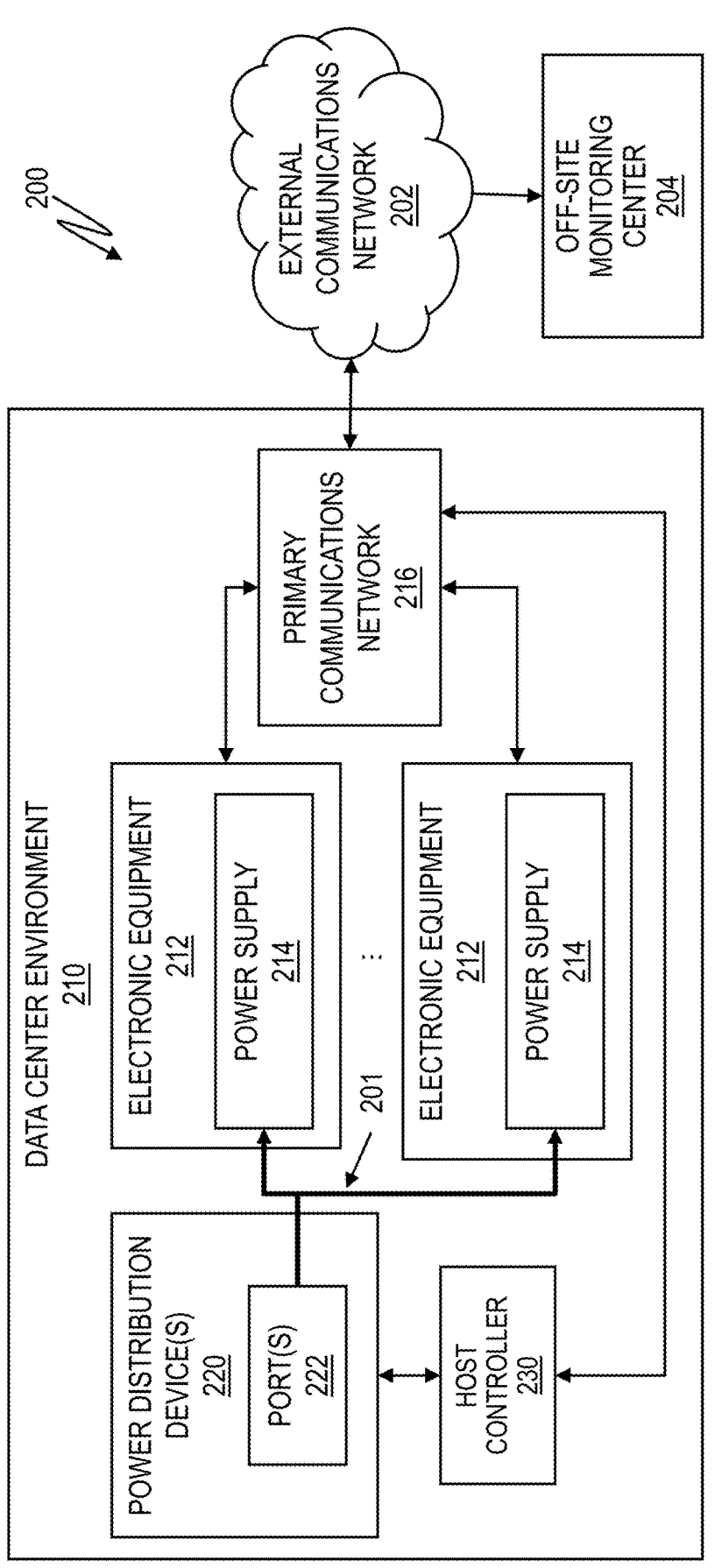
FIG. 2 depicts a block diagram of a system for verification of power cable connections in a data center environment in accordance with one or more embodiments of the present disclosure.

As described above, existing methods for verifying power cable connections in a data center environment require power cycling ports of power distribution devices to determine which piece of electronic equipment is connected to each port. Performing these methods can result in significant disruption to the operation of the data center environment and often require significant downtime. As a result, such methods are often only performed at the time of installation.

In exemplary embodiments, systems, methods, and computer program products for verifying power cable connections in a data center environment are provided. In exemplary embodiments, a mapping between the ports of a power distribution device and the electronic equipment connected to the power distribution device is created by modifying a power signal that is either provided by a specific port or drawn by a particular piece of electronic equipment and identifying the modified power signal at the corresponding piece of electronic equipment or port. In exemplary embodiments, the mapping is compared to a previously stored configuration to identify any deviation of the current configuration from the previously stored configuration. In exemplary embodiments, the method for verifying power cable connections in a data center environment is performed without requiring the deactivation of any of the ports of the power distribution device and without requiring powering down any of the pieces of electronic equipment connected to the power distribution device.

Various aspects of the present disclosure are described by narrative text, flowcharts, block diagrams of computer systems, and/or block diagrams of the machine logic included in computer program product (CPP) embodiments. With respect to any flowcharts, depending upon the technology involved, the operations can be performed in a different order than what is shown in a given flowchart. For example, again depending upon the technology involved, two operations shown in successive flowchart blocks may be performed in reverse order, as a single integrated step, concurrently, or in a manner at least partially overlapping in time.

A computer program product embodiment ("CPP embodiment" or "CPP") is a term used in the present disclosure to describe any set of one, or more, storage media (also called "mediums") collectively included in a set of one, or more, storage devices that collectively include machine readable code corresponding to instructions and/or data for performing computer operations specified in a given CPP claim. A "storage device" is any tangible device that can retain and store instructions for use by a computer processor. Without limitation, the computer-readable storage medium may be an electronic storage medium, a magnetic storage medium, an optical storage medium, an electromagnetic storage medium, a semiconductor storage medium, a mechanical storage medium, or any suitable combination of the foregoing. Some known types of storage devices that include these mediums include: diskette, hard disk, random access memory (RAM), read-only memory (ROM), erasable programmable read-only memory (EPROM or Flash memory), static random access memory (SRAM), compact disc read-only memory (CD-ROM), digital versatile disk (DVD), memory stick, floppy disk, mechanically encoded device (such as punch cards or pits/lands formed in a major surface of a disc) or any suitable combination of the foregoing. A computer readable storage medium, as that term is used in the present disclosure, is not to be construed as storage in the form of transitory signals per se, such as radio waves or other freely propagating electromagnetic waves, electromagnetic waves propagating through a waveguide, light pulses passing through a fiber optic cable, electrical signals communicated through a wire, and/or other transmission media. As will be understood by those of skill in the art, data is typically moved at some occasional points in time during normal operations of a storage device, such as during access, de-fragmentation or garbage collection, but this does not render the storage device as transitory because the data is not transitory while it is stored.

Computing environment 100 contains an example of an environment for the execution of at least some of the computer code involved in performing the inventive methods, such as providing verification of power cable connections in a data center environment as shown at block 150. In addition to block 150, computing environment 100 includes, for example, computer 101, wide area network (WAN) 102, end user device (EUD) 103, remote server 104, public Cloud 105, and private Cloud 106. In this embodiment, computer 101 includes processor set 110 (including processing circuitry 120 and cache 121), communication fabric 111, volatile memory 112, persistent storage 113 (including operating system 122 and block 150, as identified above), peripheral device set 114 (including user interface (UI), device set 123, storage 124, and Internet of Things (IoT) sensor set 125), and network module 115. Remote server 104 includes remote database 132. Public Cloud 105 includes gateway 130, Cloud orchestration module 131, host physical machine set 142, virtual machine set 143, and container set 144.

COMPUTER 101 may take the form of a desktop computer, laptop computer, tablet computer, smart phone, smart watch or other wearable computer, mainframe computer, quantum computer, a small single board computer (e.g. a Raspberry Pi) or any other form of computer or mobile device now known or to be developed in the future that is capable of running a program, accessing a network or querying a database, such as remote database 132. As is well understood in the art of computer technology, and depending upon the technology, performance of a computer-implemented method may be distributed among multiple computers and/or between multiple locations. On the other hand, in this presentation of computing environment 100, detailed discussion is focused on a single computer, specifically computer 101, to keep the presentation as simple as possible. Computer 101 may be located in a Cloud, even though it is not shown in a Cloud in FIG. 1. On the other hand, computer 101 is not required to be in a Cloud except to any extent as may be affirmatively indicated.

PROCESSOR SET 110 includes one, or more, computer processors of any type now known or to be developed in the future. Processing circuitry 120 may be distributed over multiple packages, for example, multiple, coordinated integrated circuit chips. Processing circuitry 120 may implement multiple processor threads and/or multiple processor cores. Cache 121 is memory that is located in the processor chip package(s) and is typically used for data or code that should be available for rapid access by the threads or cores running on processor set 110. Cache memories are typically organized into multiple levels depending upon relative proximity to the processing circuitry. Alternatively, some, or all, of the cache for the processor set may be located "off chip." In some computing environments, processor set 110 may be designed for working with qubits and performing quantum computing.

Computer readable program instructions are typically loaded onto computer 101 to cause a series of operational steps to be performed by processor set 110 of computer 101 and thereby effect a computer-implemented method, such that the instructions thus executed will instantiate the methods specified in flowcharts and/or narrative descriptions of computer-implemented methods included in this document (collectively referred to as "the inventive methods"). These computer readable program instructions are stored in various types of computer readable storage media, such as cache 121 and the other storage media discussed below. The program instructions, and associated data, are accessed by processor set 110 to control and direct performance of the inventive methods. In computing environment 100, at least some of the instructions for performing the inventive methods may be stored in block 150 in persistent storage 113.

COMMUNICATION FABRIC 111 is the signal conduction paths that allow the various components of computer 101 to communicate with each other. Typically, this fabric is made of switches and electrically conductive paths, such as the switches and electrically conductive paths that make up busses, bridges, physical input/output ports and the like. Other types of signal communication paths may be used, such as fiber optic communication paths and/or wireless communication paths.

VOLATILE MEMORY 112 is any type of volatile memory now known or to be developed in the future. Examples include dynamic type random access memory (RAM) or static type RAM. Typically, the volatile memory is characterized by random access, but this is not required unless affirmatively indicated. In computer 101, the volatile memory 112 is located in a single package and is internal to computer 101, but, alternatively or additionally, the volatile memory may be distributed over multiple packages and/or located externally with respect to computer 101.

PERSISTENT STORAGE 113 is any form of non-volatile storage for computers that is now known or to be developed in the future. The non-volatility of this storage means that the stored data is maintained regardless of whether power is being supplied to computer 101 and/or directly to persistent storage 113. Persistent storage 113 may be a read only memory (ROM), but typically at least a portion of the persistent storage allows writing of data, deletion of data and re-writing of data. Some familiar forms of persistent storage include magnetic disks and solid-state storage devices. Operating system 122 may take several forms, such as various known proprietary operating systems or open-source Portable Operating System Interface type operating systems that employ a kernel. The code included in block 150 typically includes at least some of the computer code involved in performing the inventive methods.

PERIPHERAL DEVICE SET 114 includes the set of peripheral devices of computer 101. Data communication connections between the peripheral devices and the other components of computer 101 may be implemented in various ways, such as Bluetooth connections, Near-Field Communication (NFC) connections, connections made by cables (such as universal serial bus (USB) type cables), insertion type connections (for example, secure digital (SD) card), connections made though local area communication networks and even connections made through wide area networks such as the internet. In various embodiments, UI device set 123 may include components such as a display screen, speaker, microphone, wearable devices (such as goggles and smart watches), keyboard, mouse, printer, touchpad, game controllers, and haptic devices. Storage 124 is external storage, such as an external hard drive, or insertable storage, such as an SD card. Storage 124 may be persistent and/or volatile. In some embodiments, storage 124 may take the form of a quantum computing storage device for storing data in the form of qubits. In embodiments where computer 101 is required to have a large amount of storage (for example, where computer 101 locally stores and manages a large database) then this storage may be provided by peripheral storage devices designed for storing very large amounts of data, such as a storage area network (SAN) that is shared by multiple, geographically distributed computers. IoT sensor set 125 is made up of sensors that can be used in Internet of Things applications. For example, one sensor may be a thermometer and another sensor may be a motion detector.

NETWORK MODULE 115 is the collection of computer software, hardware, and firmware that allows computer 101 to communicate with other computers through WAN 102. Network module 115 may include hardware, such as modems or Wi-Fi signal transceivers, software for packetizing and/or de-packetizing data for communication network transmission, and/or web browser software for communicating data over the internet. In some embodiments, network control functions and network forwarding functions of network module 115 are performed on the same physical hardware device. In other embodiments (for example, embodiments that utilize software-defined networking (SDN)), the control functions and the forwarding functions of network module 115 are performed on physically separate devices, such that the control functions manage several different network hardware devices. Computer readable program instructions for performing the inventive methods can typically be downloaded to computer 101 from an external computer or external storage device through a network adapter card or network interface included in network module 115.

WAN 102 is any wide area network (for example, the internet) capable of communicating computer data over non-local distances by any technology for communicating computer data, now known or to be developed in the future. In some embodiments, the WAN may be replaced and/or supplemented by local area networks (LANs) designed to communicate data between devices located in a local area, such as a Wi-Fi network. The WAN and/or LANs typically include computer hardware such as copper transmission cables, optical transmission fibers, wireless transmission, routers, firewalls, switches, gateway computers and edge servers.

END USER DEVICE (EUD) 103 is any computer system that is used and controlled by an end user (for example, a customer of an enterprise that operates computer 101), and may take any of the forms discussed above in connection with computer 101. EUD 103 typically receives helpful and useful data from the operations of computer 101. For example, in a hypothetical case where computer 101 is designed to provide a recommendation to an end user, this recommendation would typically be communicated from network module 115 of computer 101 through WAN 102 to EUD 103. In this way, EUD 103 can display, or otherwise present, the recommendation to an end user. In some embodiments, EUD 103 may be a client device, such as thin client, heavy client, mainframe computer, desktop computer and so on.

REMOTE SERVER 104 is any computer system that serves at least some data and/or functionality to computer 101. Remote server 104 may be controlled and used by the same entity that operates computer 101. Remote server 104 represents the machine(s) that collects and store helpful and useful data for use by other computers, such as computer 101. For example, in a hypothetical case where computer 101 is designed and programmed to provide a recommendation based on historical data, then this historical data may be provided to computer 101 from remote database 132 of remote server 104.

PUBLIC CLOUD 105 is any computer system available for use by multiple entities that provides on-demand availability of computer system resources and/or other computer capabilities, especially data storage (Cloud storage) and computing power, without direct active management by the user. Cloud computing typically leverages the sharing of resources to achieve coherence and economies of scale. The direct and active management of the computing resources of public Cloud 105 is performed by the computer hardware and/or software of Cloud orchestration module 131. The computing resources provided by public Cloud 105 are typically implemented by virtual computing environments that run on various computers making up the computers of host physical machine set 142, which is the universe of physical computers in and/or available to public Cloud 105. The virtual computing environments (VCEs) typically take the form of virtual machines from virtual machine set 143 and/or containers from container set 144. It is understood that these VCEs may be stored as images and may be transferred among and between the various physical machine hosts, either as images or after the instantiation of the VCE. Cloud orchestration module 131 manages the transfer and storage of images, deploys new instantiations of VCEs, and manages active instantiations of VCE deployments. Gateway 130 is the collection of computer software, hardware, and firmware that allows public Cloud 105 to communicate through WAN 102.

Some further explanation of virtualized computing environments (VCEs) will now be provided. VCEs can be stored as "images." A new active instance of the VCE can be instantiated from the image. Two familiar types of VCEs are virtual machines and containers. A container is a VCE that uses operating-system-level virtualization. This refers to an operating system feature in which the kernel allows the existence of multiple isolated user-space instances, called containers. These isolated user-space instances typically behave as real computers from the point of view of programs running in them. A computer program running on an ordinary operating system can utilize all resources of that computer, such as connected devices, files and folders, network shares, CPU power, and quantifiable hardware capabilities. However, programs running inside a container can only use the contents of the container and devices assigned to the container, a feature which is known as containerization.

PRIVATE CLOUD 106 is similar to public Cloud 105, except that the computing resources are only available for use by a single enterprise. While private Cloud 106 is depicted as being in communication with WAN 102, in other embodiments a private Cloud may be disconnected from the internet entirely and only accessible through a local/private network. A hybrid Cloud is a composition of multiple Clouds of different types (for example, private, community, or public Cloud types), often respectively implemented by different vendors. Each of the multiple Clouds remains a separate and discrete entity, but the larger hybrid Cloud architecture is bound together by standardized or proprietary technology that enables orchestration, management, and/or data/application portability between the multiple constituent Clouds. In this embodiment, public Cloud 105 and private Cloud 106 are both part of a larger hybrid Cloud.

Referring now to FIG. 2, a block diagram of a system 200 for verification of power cable connections in a data center environment 210 in accordance with one or more embodiments of the present disclosure is shown. In exemplary embodiments, the data center environment 210 is a server rack, server drawer, or the like that includes a plurality of pieces of electronic equipment 212. The data center environment 210 also includes a power distribution device 220 that includes a plurality of ports 222, or plugs. Although only a single power distribution device 220 is illustrated, the data center environment 210 may include multiple power distribution devices 220. For example, in one embodiment, the data center environment 210 includes multiple power distribution devices 220 that supply power to the same pieces of electronic equipment 212 which have multiple power supplies.

Each of the plurality of pieces of electronic equipment 212 includes a power supply unit 214 that is connected to port 222 of the power distribution device 220 via a power cable 201. In some embodiments, one or more pieces of electronic equipment 212 include multiple power supply units 214 that may be connected to different power distribution devices 220 or to different ports of a single power distribution device 220. The data center environment 210 also includes a primary communications network 216, such as a local area network, that is configured to facilitate communication among one or more of the plurality of pieces of electronic equipment 212. The data center environment 210 further includes a host controller 230 that is configured to communicate with the plurality of pieces of electronic equipment 212 and the power distribution device 220, either directly or via the primary communications network 216.

In exemplary embodiments, the host controller 230 is configured to verify the connections of cables 201 between ports 222 of the power distribution device 220 and the plurality of pieces of electronic equipment 212. In one embodiment, the host controller 230 instructs the power supply unit of a piece of electronic equipment 212 to modify a power signal received from the power distribution device 220 and monitors ports 222 to identify which port 222 is connected to the piece of electronic equipment 212. In another embodiment, the host controller 230 instructs the power distribution device 220 to modify a power signal provided by port 222 and identifies the piece of electronic equipment 212 connected to port 222. In exemplary embodiments, the host controller 230 creates a mapping of the ports 222 of the power distribution device 220 to the plurality of pieces of electronic equipment 212.

In one embodiment, the host controller 230 may be configured to compare the mapping to a stored configuration, which indicates a predetermined set of connections between the ports 222 of the power distribution device 220 to the plurality of pieces of electronic equipment 212, to identify any deviation between the created mapping and the stored configuration. In the event a deviation is identified, the host controller 230 is configured to transmit an alert to an off-site monitoring center 204 via an external communications network 202. In another embodiment, the host controller 230 is configured to transmit the mapping to the off-site monitoring center 204 via an external communications network 202 and the off-site monitoring center 204 is configured to compare the mapping and the stored configuration to identify any deviations.

Figure 3:
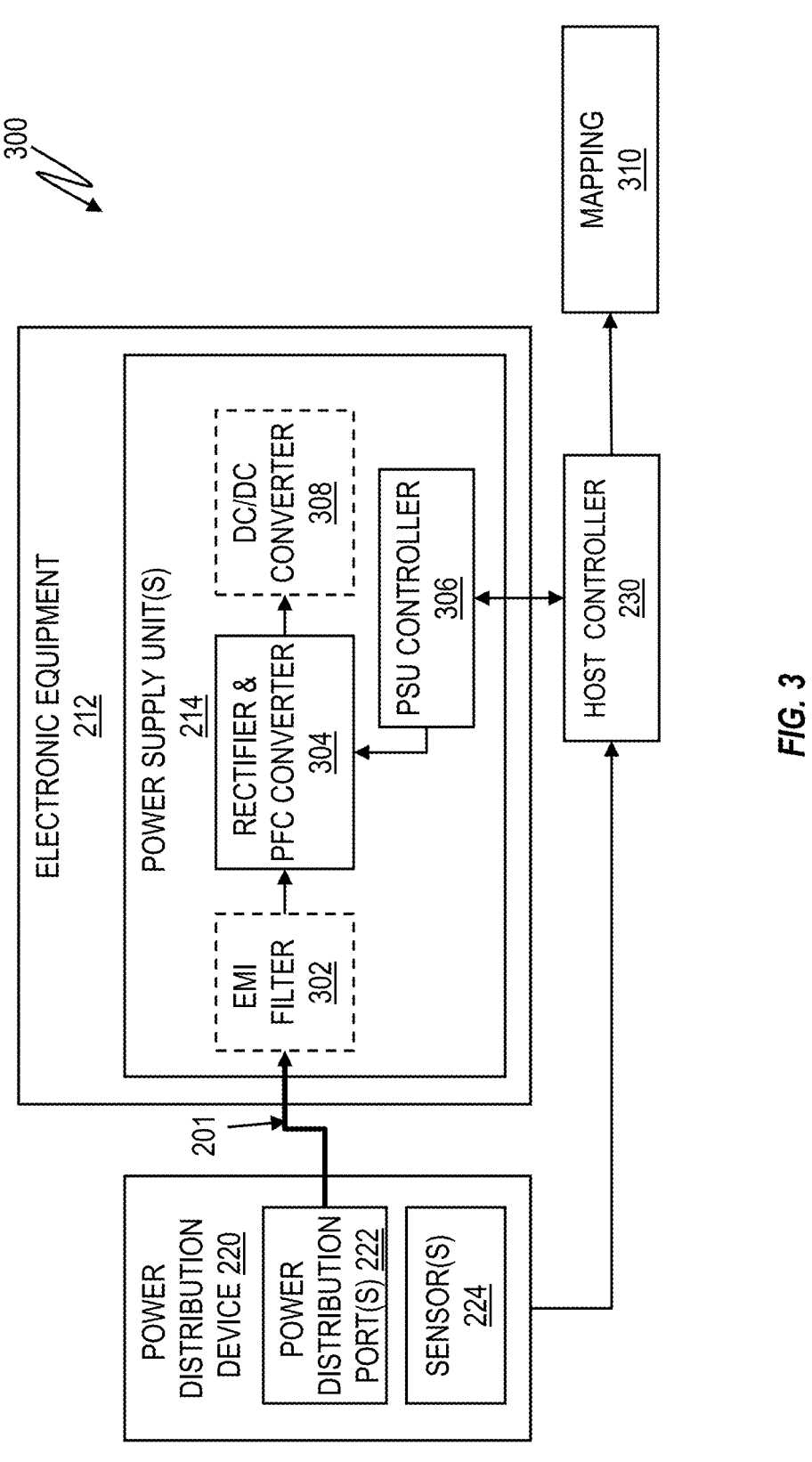
FIG. 3 depicts a block diagram of a system for verification of a power cable connection between a power distribution device and electronic equipment in accordance with one or more embodiments of the present disclosure.

Referring now to FIG. 3, a block diagram of a system 300 for verification of a power cable connection between a power distribution device 220 and an electronic equipment 212 in accordance with one or more embodiments of the present disclosure is shown. As illustrated, the power distribution device 220 includes a plurality of power distribution ports 222, or power plugs, and one or more sensors 224 that are configured to monitor the power provided by each of the plurality of power distribution ports 222. One or more of the plurality of power distribution ports 222 are connected, via a power cable 201, to a power supply unit 214 of a piece of electronic equipment 212.

In exemplary embodiments, the power supply unit 214 of at least one piece of electronic equipment 212 includes an electromagnetic interference (EMI) 302 that is configured to receive a power signal from the power distribution device 220 and to suppress unwanted high-frequency electromagnetic noise. The power supply unit 214 also includes a power factor correction (PFC) converter and rectifier 304 that are used to reduce the harmonic distortion, increase the power factor, to convert an alternating current (AC) into a direct current (DC). In exemplary embodiments, the power supply unit 214 also includes a DC/DC converter 308 that is configured to convert the output of the PFC converter and rectifier 304 to a desired DC voltage.

In exemplary embodiments, the PFC converter and rectifier 304 are controlled by a PSU controller 306 to modify a power signal received from the power distribution device 220. In exemplary embodiments, the PSU controller 306 may selectively activate and deactivate the PFC converter and rectifier 304 to control a waveform of AC power that is drawn by the power supply unit 214 from port 222 of the power distribution device 220. In exemplary embodiments, the PSU controller 306 is configured to communicate with a host controller 230. In one embodiment, the host controller 230 is configured to provide commands to the PSU controller 306.

In exemplary embodiments, the host controller 230 is configured to selectively instruct the PSU controller 306 of a power supply unit 214 to modify a power signal drawn by the power supply unit 214 from the power distribution device 220. In addition, the host controller 230 is configured to monitor the sensors 224 of the power distribution device 220 to identify port 222 of the power distribution device 220 that is connected to the power supply unit 214 that was instructed to modify a power signal drawn by the power supply unit 214 from the power distribution device 220. The host controller 230 is configured to create a mapping 310 of the connections between ports 222 and the electronic equipment by iteratively repeating this process for each of the power supply units 214. In one embodiment, different modifications to the power signals drawn by different power supply units 214 from the power distribution device 220 can be performed simultaneously. In another embodiment, the same modification to the power signals drawn by different power supply units 214 from the power distribution device 220 can be performed at different times.

Figures 4A, 4B, 4C:
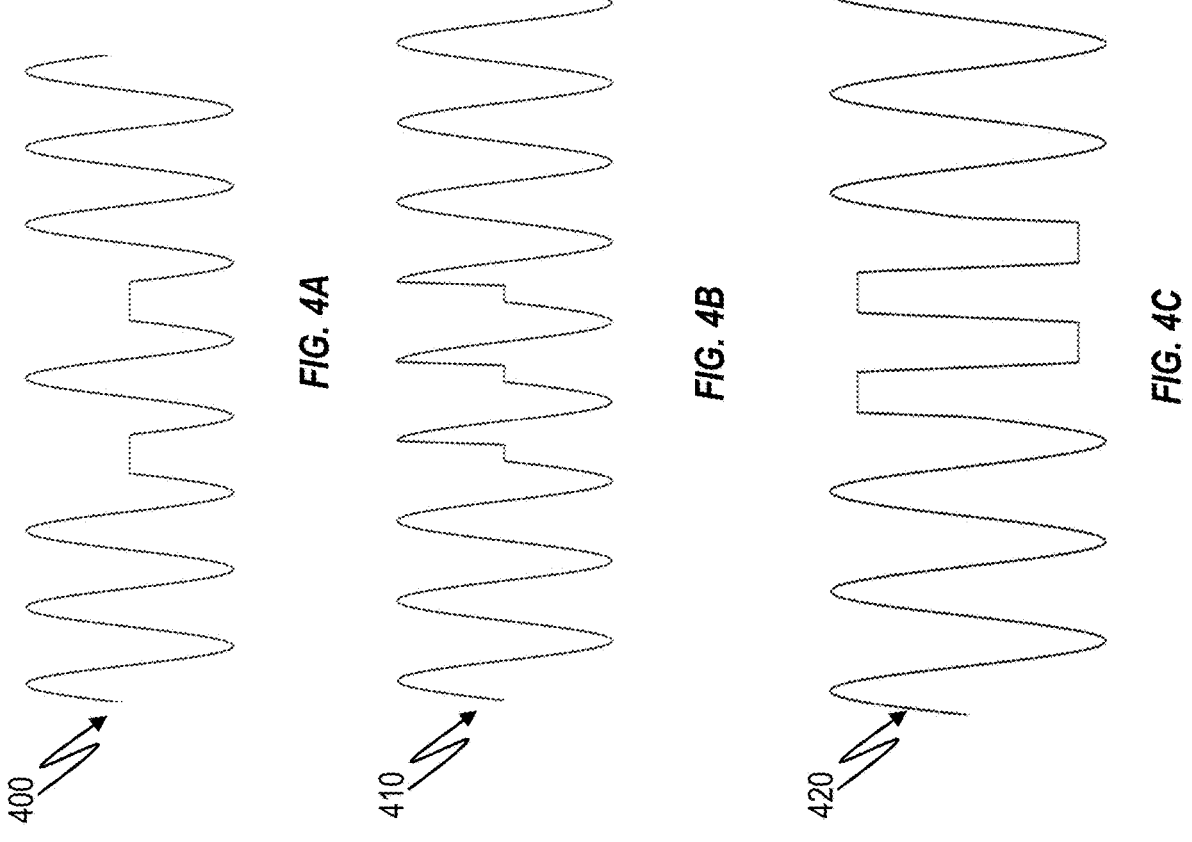
FIGS. 4A, 4B, and 4C depict waveforms illustrating modified power signals for use in the verification of power cable connections in a data center environment in accordance with one or more embodiments of the present disclosure.

Referring now to FIGS. 4A, 4B, and 4C, waveforms illustrating modified power signals for use in the verification of power cable connections in a data center environment in accordance with one or more embodiments of the present disclosure are shown. FIG. 4A illustrates a waveform 400 that includes skipping every $X^{th}$ half AC cycle, FIG. 4B illustrates a waveform 410 that depicts skipping 0-90° for X AC cycles, and FIG. 4C illustrates a waveform 420 that depicts drawing a high total harmonic distortion current for X AC cycles. In exemplary embodiments, the host controller may instruct the power distribution device to output a power signal having one of the waveforms 400, 410, or 420 and may detect which power supply received the waveform. Likewise, the host controller may instruct the power supply unit of electronic equipment to modify a received power signal to be one of the waveforms 400, 410, or 420 and may identify the port of the power distribution device that corresponds to the power supply unit. The waveforms 400, 410, or 420 are provided as example waveforms and a variety of other waveforms may also be used.

Referring now to FIG. 5, a flowchart of a method 500 for power cable connection verification in a data center environment having a plurality of pieces of electronic equipment connected to a power distribution device in accordance with one or more embodiments of the present disclosure is shown. As shown at block 502, the method 500 includes instructing a first power supply of a first piece of electronic equipment of the plurality of pieces of electronic equipment to modify a first power signal received from the power distribution device. In exemplary embodiments, the instructions to modify the first power signal include an identification of a first modification to make to the first power signal.

Next, as shown at block 504, the method 500 includes instructing a second power supply of a second piece of electronic equipment of the plurality of pieces of electronic equipment to modify a second power signal received from the power distribution device. In exemplary embodiments, the instructions to modify the second power signal include an identification of a second modification to make to the second power signal. In one embodiment, the first modification is different than the second modification. In another embodiment, the instructions to modify the first power signal indicate a timing of the first modification, the instructions to modify the second power signal indicate the timing of the second modification, and the timing of the first modification is different than the timing of the second modification.

At block 506, the method 500 includes identifying a first port of a plurality of ports of the power distribution device corresponding to the first power signal and a second port of the plurality of ports of the power distribution device corresponding to the second power signal. Next, as shown at block 508, the method 500 includes creating a mapping of the plurality of pieces of electronic equipment to the plurality of ports of the power distribution device. In exemplary embodiments, the mapping includes an identification of which port of the plurality of ports of the power distribution device is connected to each of the plurality of pieces of electronic equipment. Once the mapping has been created, the mapping is compared to a stored configuration, which is a predetermined identification of which port of the plurality of ports of the power distribution device should be connected to each of the plurality of pieces of electronic equipment.

The method 500 also includes generating an alert based on a determination that the mapping deviates from a stored configuration, as shown at block 510. In exemplary embodiments, the determination that the mapping deviates from the stored configuration is based on detecting that a port of the power distribution device configured as idle in the stored configuration is drawing power. In exemplary embodiments, the determination that the mapping deviates from the stored configuration is based on detecting that one of the plurality of pieces of electronic equipment is connected to a different port than the port indicated in the stored configuration.

Referring now to FIG. 6, a flowchart of a method 600 for verifying power cable connections in a data center environment in accordance with one or more embodiments of the present disclosure is shown. As shown at block 602, the method 600 includes instructing a first port of a power distribution device to output a first power signal. Next, as shown at block 604, the method 600 includes instruct a second port of a power distribution device to output a second power signal. In exemplary embodiments, the instructions to output the first power signal include an identification of a first waveform to use for the first power signal and the instructions to output the second power signal include an identification of a second waveform to use for the second power signal. In one embodiment, the first waveform is different than the second waveform. In another embodiment, the instructions to output the first power signal indicate a timing for outputting the first power signal, the instructions to output the second power signal indicate a timing for outputting the second power signal, and the timing of the first power signal is different than the timing of the second power signal.

At block 606, the method 600 includes identifying a first piece of electronic equipment as being connected to the first port and a second piece of electronic equipment as being connected to the second port. Next, as shown at block 608, the method 600 includes creating a mapping of a plurality of pieces of electronic equipment to a plurality of ports of the power distribution device. In exemplary embodiments, the mapping includes an identification of which port of the plurality of ports of the power distribution device is connected to each of the plurality of pieces of electronic equipment. Once the mapping has been created, the mapping is compared to a stored configuration, which is a predetermined identification of which port of the plurality of ports of the power distribution device should be connected to each of the plurality of pieces of electronic equipment.

The method 600 also includes generating an alert based on a determination that the mapping deviates from a stored configuration, as shown at block 610. In exemplary embodiments, the determination that the mapping deviates from the stored configuration is based on detecting that a port of the power distribution device configured as idle in the stored configuration is drawing power. In exemplary embodiments, the determination that the mapping deviates from the stored configuration is based on detecting that one of the plurality of pieces of electronic equipment is connected to a different port than the port indicated in the stored configuration.

In exemplary embodiments, the disclosed methods for verifying power cable connections can be triggered to run on-demand, or periodically. In one embodiment, a program is embedded inside the PSU to draw a specific characterized current pattern and instrumentation disposed on the PDU is used to detect the specific current pattern to confirm PDU-PSU cabling specific current pattern. In some embodiments, each PSU is configured to draw a unique waveform that is identified by the instrumentation disposed on the PDU.

Various embodiments are described herein with reference to the related drawings. Alternative embodiments can be devised without departing from the scope of the present disclosure. Various connections and positional relationships (e.g., over, below, adjacent, etc.) are set forth between elements in the following description and in the drawings. These connections and/or positional relationships, unless specified otherwise, can be direct or indirect, and the present disclosure is not intended to be limiting in this respect. Accordingly, a coupling of entities can refer to either a direct or an indirect coupling, and a positional relationship between entities can be a direct or indirect positional relationship. Moreover, the various tasks and process steps described herein can be incorporated into a more comprehensive procedure or process having additional steps or functionality not described in detail herein.

One or more of the methods described herein can be implemented with any or a combination of the following technologies, which are each well known in the art: a discrete logic circuit(s) having logic gates for implementing logic functions upon data signals, an application specific integrated circuit (ASIC) having appropriate combinational logic gates, a programmable gate array(s) (PGA), a field programmable gate array (FPGA), etc.

For the sake of brevity, conventional techniques related to making and using aspects of the present disclosure may or may not be described in detail herein. In particular, various aspects of computing systems and specific computer programs to implement the various technical features described herein are well known. Accordingly, in the interest of brevity, many conventional implementation details are only mentioned briefly herein or are omitted entirely without providing the well-known system and/or process details.

In some embodiments, various functions or acts can take place at a given location and/or in connection with the operation of one or more apparatuses or systems. In some embodiments, a portion of a given function or act can be performed at a first device or location, and the remainder of the function or act can be performed at one or more additional devices or locations.

The terminology used herein is for the purpose of describing particular embodiments only and is not intended to be limiting. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, element components, and/or groups thereof.

The corresponding structures, materials, acts, and equivalents of all means or step plus function elements in the claims below are intended to include any structure, material, or act for performing the function in combination with other claimed elements as specifically claimed. The present disclosure has been presented for purposes of illustration and description, but is not intended to be exhaustive or limited to the form disclosed. Many modifications and variations will be apparent to those of ordinary skill in the art without departing from the scope and spirit of the disclosure. The embodiments were chosen and described in order to best explain the principles of the disclosure and the practical application, and to enable others of ordinary skill in the art to understand the disclosure for various embodiments with various modifications as are suited to the particular use contemplated.

The diagrams depicted herein are illustrative. There can be many variations to the diagram or the steps (or operations) described therein without departing from the spirit of the disclosure. For instance, the actions can be performed in a differing order or actions can be added, deleted or modified. Also, the term "coupled" describes having a signal path between two elements and does not imply a direct connection between the elements with no intervening elements/connections therebetween. All of these variations are considered a part of the present disclosure.

The following definitions and abbreviations are to be used for the interpretation of the claims and the specification. As used herein, the terms "comprises," "comprising," "includes," "including," "has," "having," "contains" or "containing," or any other variation thereof, are intended to cover a non-exclusive inclusion. For example, a composition, a mixture, process, method, article, or apparatus that comprises a list of elements is not necessarily limited to only those elements but can include other elements not expressly listed or inherent to such composition, mixture, process, method, article, or apparatus.

Additionally, the term "exemplary" is used herein to mean "serving as an example, instance or illustration." Any embodiment or design described herein as "exemplary" is not necessarily to be construed as preferred or advantageous over other embodiments or designs. The terms "at least one" and "one or more" are understood to include any integer number greater than or equal to one, i.e. one, two, three, four, etc. The terms "a plurality" are understood to include any integer number greater than or equal to two, i.e. two, three, four, five, etc. The term "connection" can include both an indirect "connection" and a direct "connection."

The terms "about," "substantially," "approximately," and variations thereof, are intended to include the degree of error associated with measurement of the particular quantity based upon the equipment available at the time of filing the application. For example, "about" can include a range of $$\pm 8\% \text{ or } 5\%, \text{ or } 2\%$$

of a given value.

The present disclosure may be a system, a method, and/or a computer program product at any possible technical detail level of integration. The computer program product may include a computer readable storage medium (or media)

having computer readable program instructions thereon for causing a processor to carry out aspects of the present disclosure.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present disclosure may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instruction by utilizing state information of the computer readable program instructions to personalize the electronic circuitry, in order to perform aspects of the present disclosure.

Aspects of the present disclosure are described herein with reference to flowchart illustrations and/or block diagrams of methods, apparatus (systems), and computer program products according to embodiments of the present disclosure. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present disclosure. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present disclosure have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments described herein.

What is claimed is:

1. A computer-implemented method for power cable connection verification in a data center environment having a plurality of pieces of electronic equipment connected to a power distribution device, the method comprising:

instructing a first power supply of a first piece of electronic equipment of the plurality of pieces of electronic equipment to modify a first power signal received from the power distribution device;

instructing a second power supply of a second piece of electronic equipment of the plurality of pieces of electronic equipment to modify a second power signal received from the power distribution device;

identifying a first port of a plurality of ports of the power distribution device corresponding to the first power signal and a second port of the plurality of ports of the power distribution device corresponding to the second power signal;

creating a mapping of the plurality of pieces of electronic equipment to the plurality of ports of the power distribution device;

comparing the mapping of the plurality of pieces of electronic equipment to the plurality of ports of the power distribution device to a stored configuration; and generating an alert based on a determination that the mapping deviates from the stored configuration.

2. The computer-implemented method of claim 1, wherein the instructions to modify the first power signal include an identification of a first modification to make to the first power signal.

3. The computer-implemented method of claim 1, wherein the determination that the mapping deviates from the stored configuration is based on detecting that a port of the power distribution device configured as idle in the stored configuration is drawing power.

4. The computer-implemented method of claim 2, wherein the instructions to modify the second power signal include an identification of a second modification to make to the second power signal.

5. The computer-implemented method of claim 2, wherein:

the instructions to modify the first power signal indicate a timing of the first modification;

the instructions to modify the second power signal indicate a timing of the second modification; and the timing of the first modification is different than the timing of the second modification.

6. The computer-implemented method of claim 4, wherein the first modification is different than the second modification.

7. A computing system having a memory having computer readable instructions and one or more processors for executing the computer readable instructions, the computer readable instructions controlling the one or more processors to perform operations comprising:

instructing a first power supply of a first piece of electronic equipment of a plurality of pieces of electronic equipment to modify a first power signal received from a power distribution device;

instructing a second power supply of a second piece of electronic equipment of the plurality of pieces of electronic equipment to modify a second power signal received from the power distribution device;

identifying a first port of a plurality of ports of the power distribution device corresponding to the first power signal and a second port of the plurality of ports of the power distribution device corresponding to the second power signal;

creating a mapping of the plurality of pieces of electronic equipment to the plurality of ports of the power distribution device;

comparing the mapping of the plurality of pieces of electronic equipment to the plurality of ports of the power distribution device to a stored configuration; and generating an alert based on a determination that the mapping deviates from the stored configuration.

8. The computing system of claim 7, wherein the instructions to modify the first power signal include an identification of a first modification to make to the first power signal.

9. The computing system of claim 7, wherein the determination that the mapping deviates from the stored configuration is based on detecting that a port of the power distribution device configured as idle in the stored configuration is drawing power.

10. The computing system of claim 8, wherein the instructions to modify the second power signal include an identification of a second modification to make to the second power signal.

11. The computing system of claim 8, wherein:

the instructions to modify the first power signal indicate a timing of the first modification;

the instructions to modify the second power signal indicate a timing of the second modification; and the timing of the first modification is different than the timing of the second modification.

12. The computing system of claim 10, wherein the first modification is different than the second modification.

13. A computer program product comprising a computer readable storage medium having program instructions embodied therewith, the program instructions executable by a processor to cause the processor to perform operations comprising:

instructing a first power supply of a first piece of electronic equipment of a plurality of pieces of electronic equipment to modify a first power signal received from a power distribution device;

instructing a second power supply of a second piece of electronic equipment of the plurality of pieces of electronic equipment to modify a second power signal received from the power distribution device;

identifying a first port of a plurality of ports of the power distribution device corresponding to the first power signal and a second port of the plurality of ports of the power distribution device corresponding to the second power signal;

creating a mapping of the plurality of pieces of electronic equipment to the plurality of ports of the power distribution device;

comparing the mapping of the plurality of pieces of electronic equipment to the plurality of ports of the power distribution device to a stored configuration; and generating an alert based on a determination that the mapping deviates from the stored configuration.

14. The computer program product of claim 13, wherein the instructions to modify the first power signal include an identification of a first modification to make to the first power signal.

15. The computer program product of claim 14, wherein the instructions to modify the second power signal include an identification of a second modification to make to the second power signal.

16. The computer program product of claim 14, wherein:

the instructions to modify the first power signal indicate a timing of the first modification;

the instructions to modify the second power signal indicate a timing of the second modification; and the timing of the first modification is different than the timing of the second modification.

17. The computer program product of claim 15, wherein the first modification is different than the second modification.

* * * * *